July 27, 1948.  W. A. WEIGHTMAN  2,446,148
SHEET METAL WORKING APPARATUS, ESPECIALLY
FOR WELDING MACHINES
Filed Nov. 9, 1943  9 Sheets-Sheet 4

Fig. 4.

William A. Weightman
INVENTOR
BY John P. Tarbox
ATTORNEY

July 27, 1948. W. A. WEIGHTMAN 2,446,148
SHEET METAL WORKING APPARATUS, ESPECIALLY
FOR WELDING MACHINES
Filed Nov. 9, 1943 9 Sheets-Sheet 8

William A. Weightman
INVENTOR

BY John P. Tarbox
ATTORNEY

July 27, 1948.  W. A. WEIGHTMAN  2,446,148
SHEET METAL WORKING APPARATUS, ESPECIALLY
FOR WELDING MACHINES
Filed Nov. 9, 1943  9 Sheets-Sheet 9

William A. Weightman
INVENTOR

BY John P. Tarbox
ATTORNEY

Patented July 27, 1948

2,446,148

UNITED STATES PATENT OFFICE 2,446,148

SHEET METAL WORKING APPARATUS, ESPECIALLY FOR WELDING MACHINES

William A. Weightman, Philadelphia, Pa., assignor to The Budd Company, a corporation of Pennsylvania Application November 9, 1943, Serial No. 509,539

8 Claims. (Cl. 29—200)

This invention relates to a sheet metal working apparatus, especially for a welding machine. Still more particularly, the invention is outstandingly designed for use in resistance roller welding apparatus adapted to weld skin sheets and reinforcing stringers together along longitudinal lines, and has for an object the provision of improvements in this art.

One of the particular objects of the invention is to provide roller welding apparatus which will accommodate very wide panels.

Another object is to provide roller welding apparatus which makes a panel accessible to welding machines located on both sides thereof.

Another object is to provide welding apparatus which holds a plurality of sheets in stretched condition, which permits manipulation of each sheet at each end, and which permits conjoint manipulation of all sheets of a panel collectively at either end.

Another object is to provide improved sheet gripping and stretching mechanism.

The above and other objects will be apparent from the following description of an exemplary embodiment of the invention, reference being made to the accompanying drawings, wherein:

Figure 1:
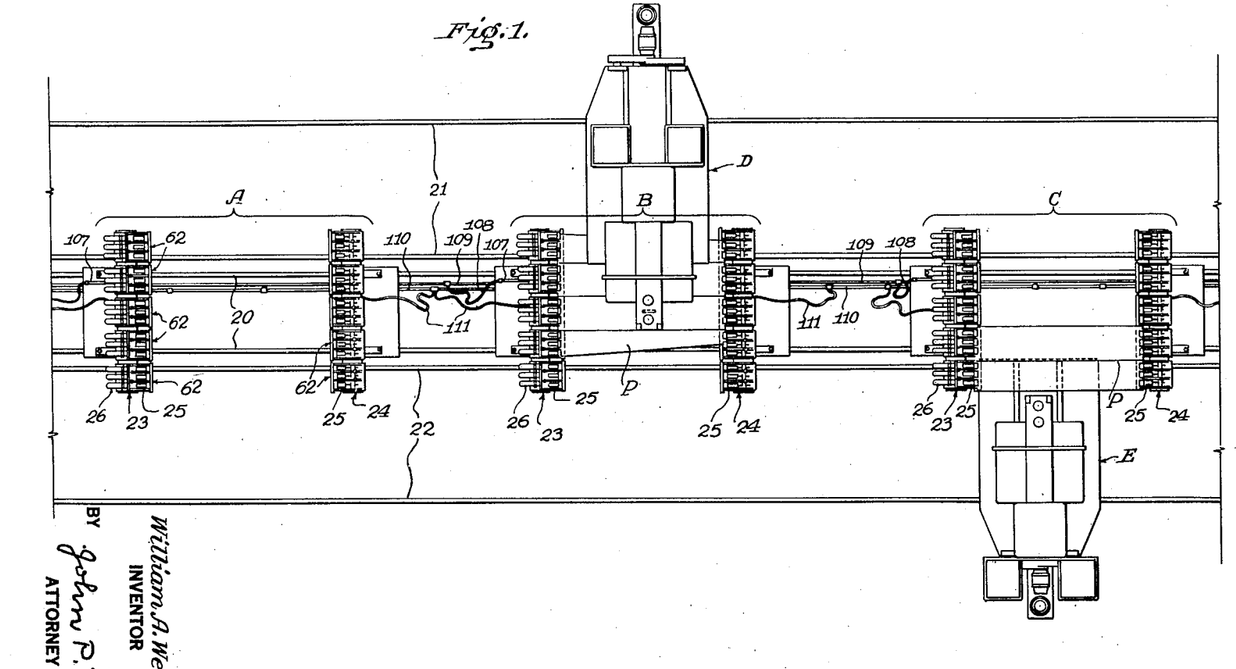
Fig. 1 is a plan view of an installation comprising a plurality of travelling roller welders and a plurality of travelling panel stretching holders.

The apparatus herein provided is intended to stretch sheets of metal to prevent buckling during welding. It is particularly applicable to thin metal sheets, such for example as of cold-rolled stainless steel, which are subjected to resistance welding, as by rollers travelling thereover. As shown in Fig. 1, it comprises a plurality of panel stretchers A, B, and C mounted to travel along a central track 20, and a plurality of roller welders D and E mounted to travel on outside tracks 21 and 22 which very precisely parallel the central track 20.

Each stretcher A, B, or C, includes a pair of sheet holding carriages or supports 23 and 24, both of which are provided with sheet or skin gripping devices 25 and one of which, 23, is provided with sheet stretching devices 26. Except for the fact that one carriage of each pair includes skin stretching means which the other does not have and that the carriages are set up in opposite directions on the track, they are identical and the following description of one will serve for both.

Figure 2:
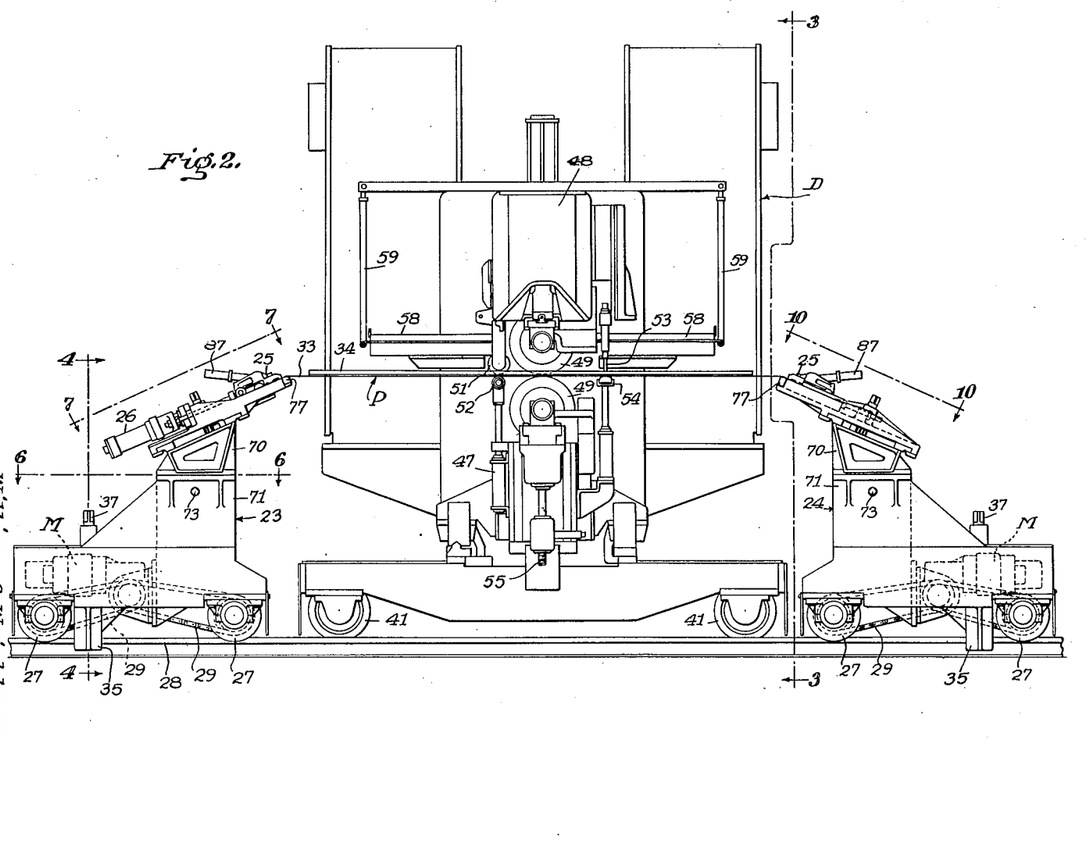
Fig. 2 is a longitudinal elevation of one welder and one pair of panel stretching holders.

As shown in Fig. 2, each stretcher carriage 23 or 24 is mounted on flanged wheels 27 which roll on rails 28 of the track 20. As a convenience, the carriages are self-propelled, as by a motor M which drives the wheels 27 through sprocket chains 29.

The stretcher carriages may be moved as a pair to any desired position along the track and may also be moved relative to each other to hold panels of any desired length. One such panel P, comprising a skin 33 and stringers 34, is shown in Fig. 2 stretched between the gripping devices or clamps 25 of one pair of carriages 23, 24. In this position, the carriages are clamped in a fixed position to the rails 28 of the track 20, as by clamping devices 35.

Figure 4:
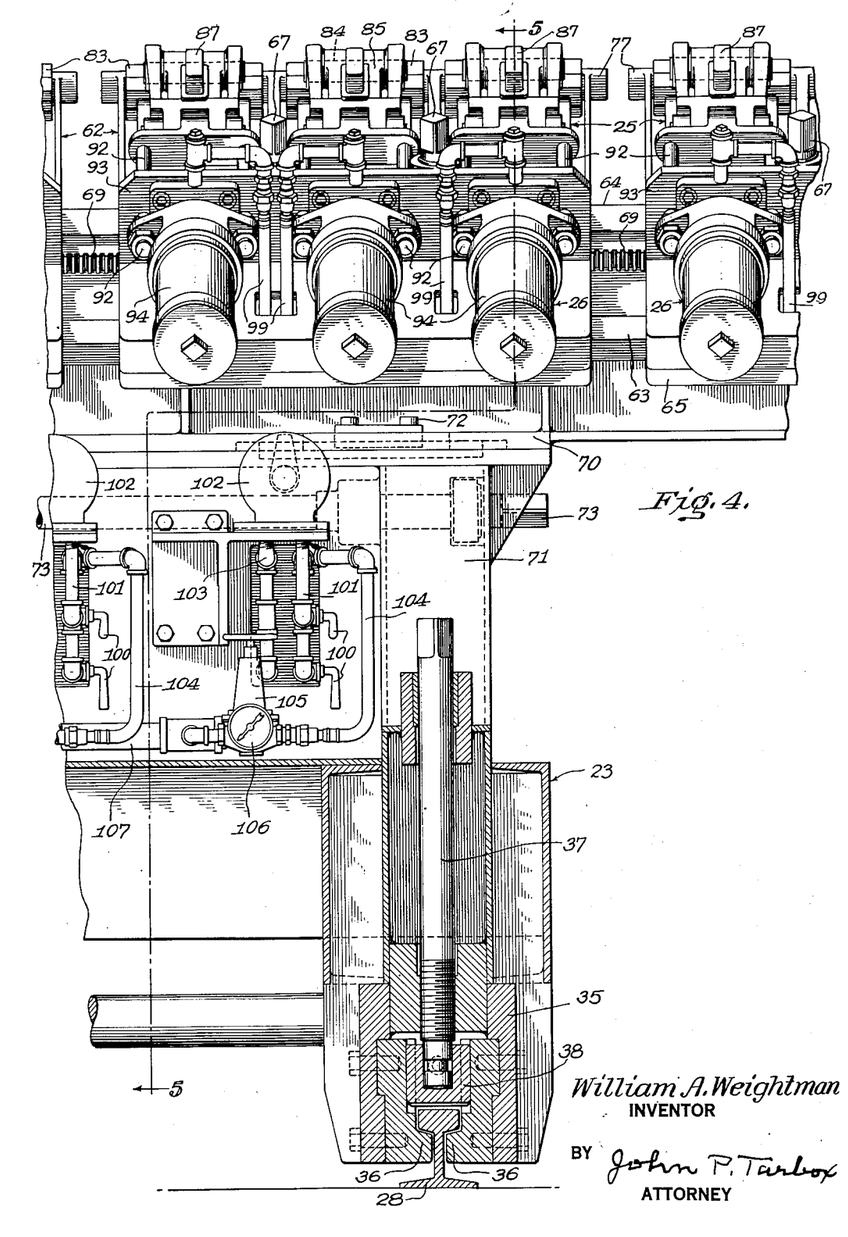
Fig. 4 is a partial transverse elevation and vertical section taken on the line 4—4 of Fig. 2.

As shown in Fig. 4, the clamping device 35 includes the lateral projections 36 which engage the underside of the rail head when pulled up by the clamp screw 37. The screw carries a block 38 on its lower end which engages the upper surface of the rail head. The clamping action, Fig. 2, raises the remote wheels 27 slightly and fulcrums the carriage about the proximate wheels 27. The terms "remote" and "proximate" refer to the relationship of the wheels of one carriage to those of the companion carriage. Inasmuch as the rails are subjected to a bending action between the clamps and the proximate wheels when the panel is pulled tight between carriages, they are made relatively deep and are strongly anchored to the foundation at short intervals.

Figure 3:
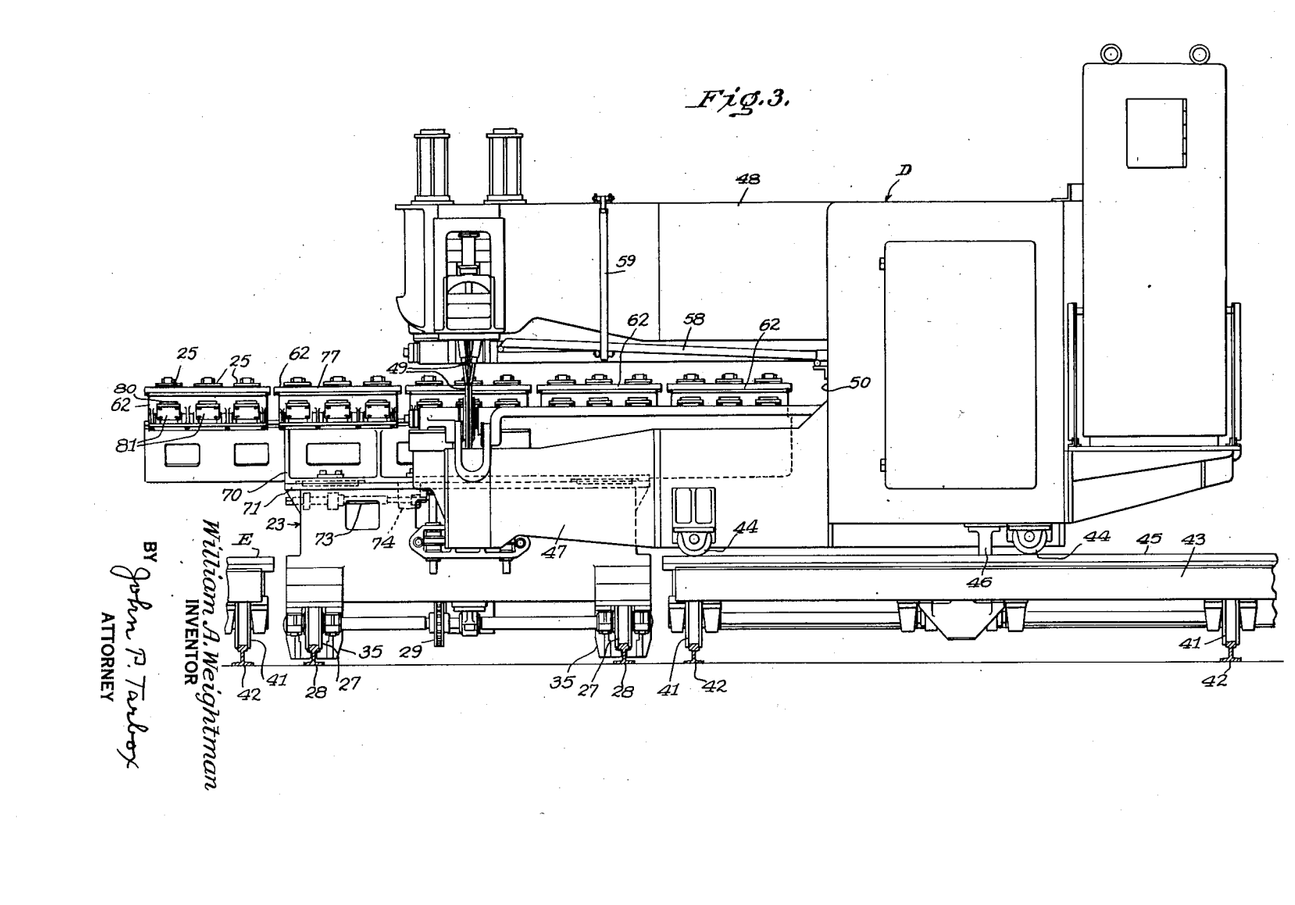
Fig. 3 is a transverse elevation taken on the line 3—3 of Fig. 2.

The welding machines D or E, Figs. 2 and 3, are mounted on flanged wheels 41 which roll on rails 42 of the tracks 21 and 22 firmly anchored to the foundation. For convenience, the welders, like the stretchers, are self-propelled, as by motive means, not shown. The welder proper is mounted for transverse movement on its chassis 43, as by flanged wheels 44 which roll upon tracks 45. A power-operated shifting and holding device 46 is provided for placing the welder in a given transverse position, and holding it securely while it is traversed longitudinally to weld along a given line.

The welder is provided with long rigid lateral arms, a lower 47 and an upper 48, carrying welding rollers 49. Between the arms a deep throat 50 is thus formed. The arms also carry stringer guide rolls 51 with companion supporting rolls 52 and peening devices 53 with supporting anvils 54. The lower welding rolls are adjustable vertically, as by a power-operated screw 55, and the upper rolls are movable vertically at the will of the operator by suitable means of any desired character.

When the rolls are disposed near the middle of a panel, it is difficult for an operator standing alongside the panel to observe the welding operation. To remedy this, a folding platform 56 is hinged to the side of the upper arm 48 so as to be folded up or swung down for the operator to lie upon. A rod 59 supports the platform in lowered position.

The sheet stock which is available for forming the skin 38 of the panel P is mostly available in limited widths only, the maximum width at present being about 26" for stainless steel. Consequently, in making a wide panel such as that contemplated herein, two or more sheets are welded together in overlapping relationship. The present apparatus provides improved means for stretching adjacent sheets, bringing them into proper overlapping relationship, and there holding them for connection and for the attachment of stringers when desired. As shown in Figs. 1 and 3, a number of adjacent sheet-holding, sheet-clamping or sheet frames 62 are mounted on each carriage. There are five for five sheets, as shown in Figs. 1 and 3.

The frames are somewhat narrower than the sheets to be held in order that the protruding edges of the thin sheets may be brought into overlapping relationship. Each sheet-holding frame is provided with a plurality of gripping devices 25, three as shown; and on each stretcher carriage 23 each gripping device 25 is provided with a stretching device 26, whereby the tension on each sheet may be adjusted and equalized across its width.

Figure 5:
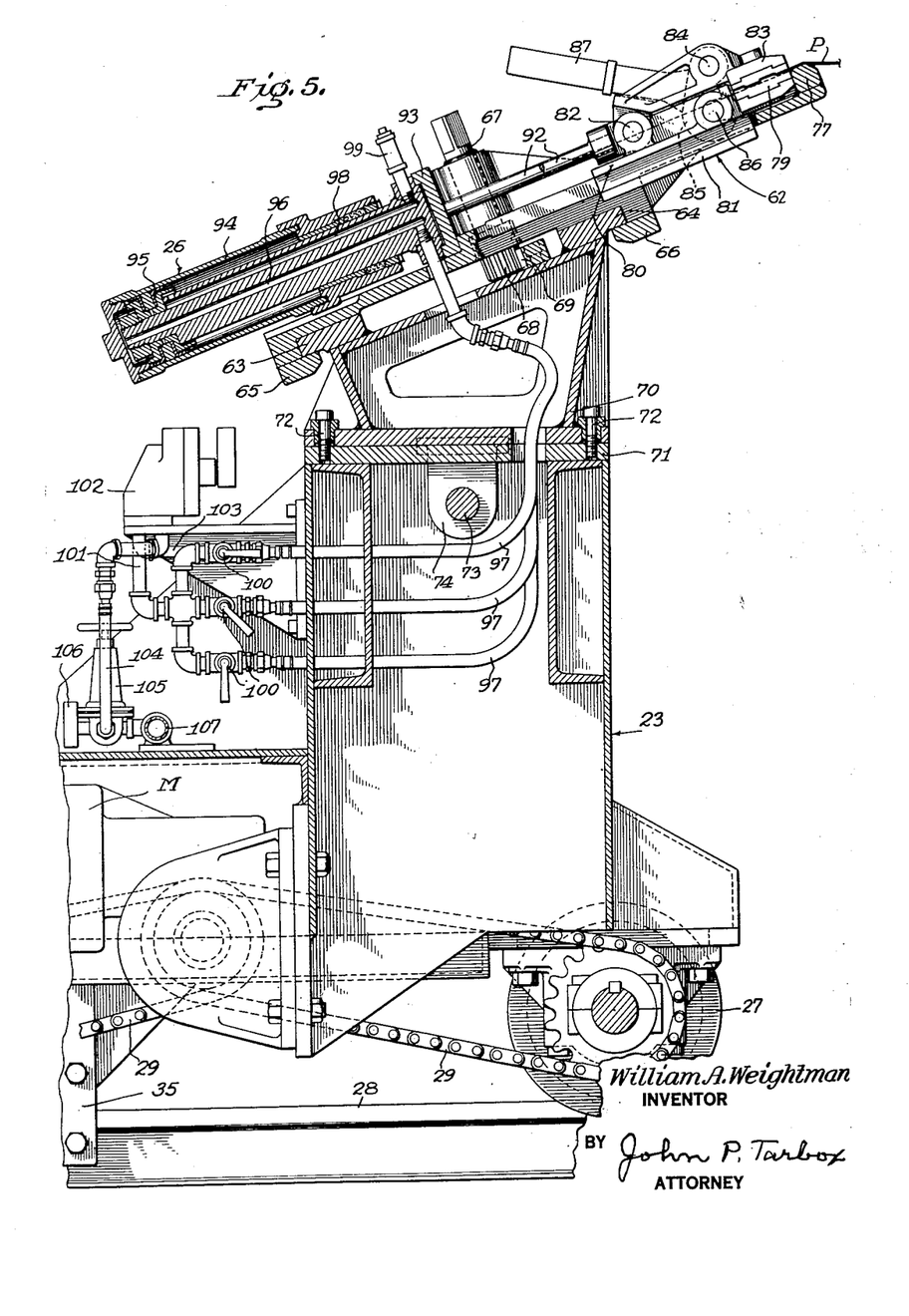
Fig. 5 is a vertical longitudinal section taken on the line 5—5 of Fig. 4.
Figure 7:
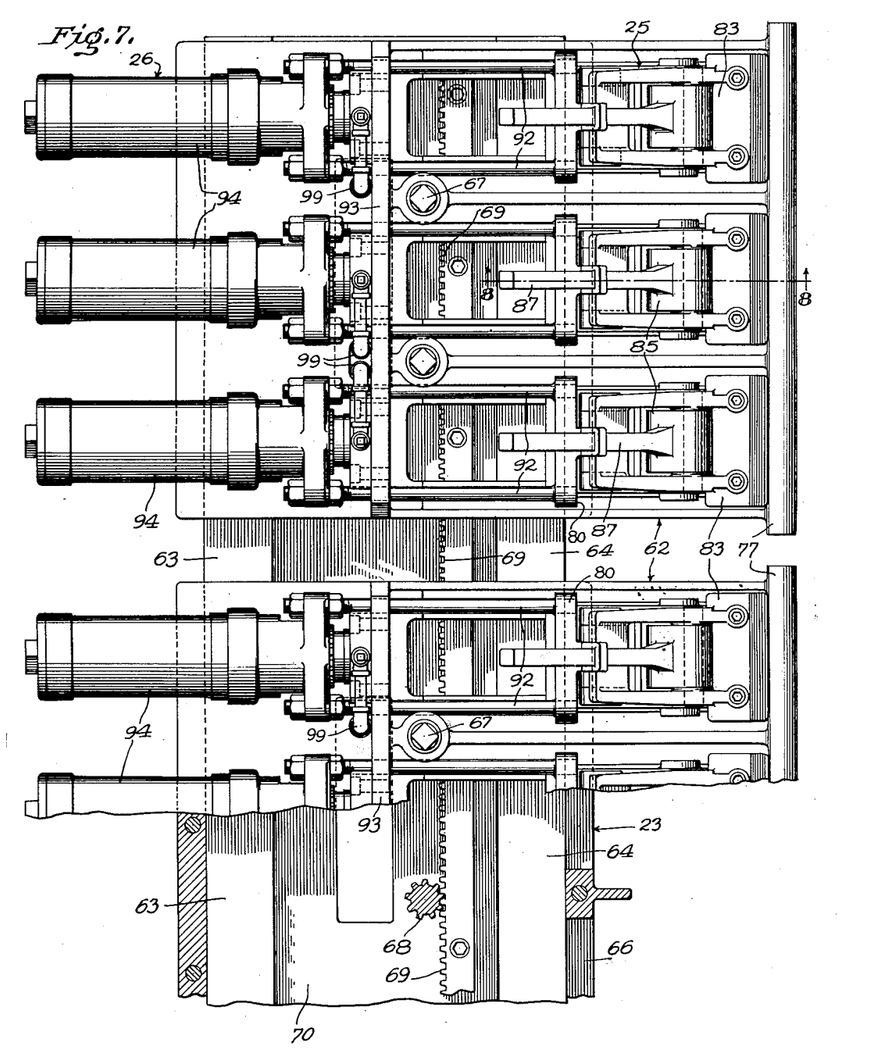
Fig. 7 is a partial top plan view of one of the panel stretcher holders, the view being taken on the line 7—7 of Fig. 2.

As shown in Figs. 5 and 7, each sheet-holding frame 62 is mounted to slide on transverse guideways 63 and 64 and has retaining strips 65 and 66 for holding it down thereon. The slide frames are moved along the guideways as desired by a pinion shaft 67 provided with a pinion 68 meshing with a relatively fixed rack 69. The upper ends of the shafts may be shaped to take a wrench and there may be a plurality of such operating shafts and pinions for each slide or sheet frame.

Figure 6:
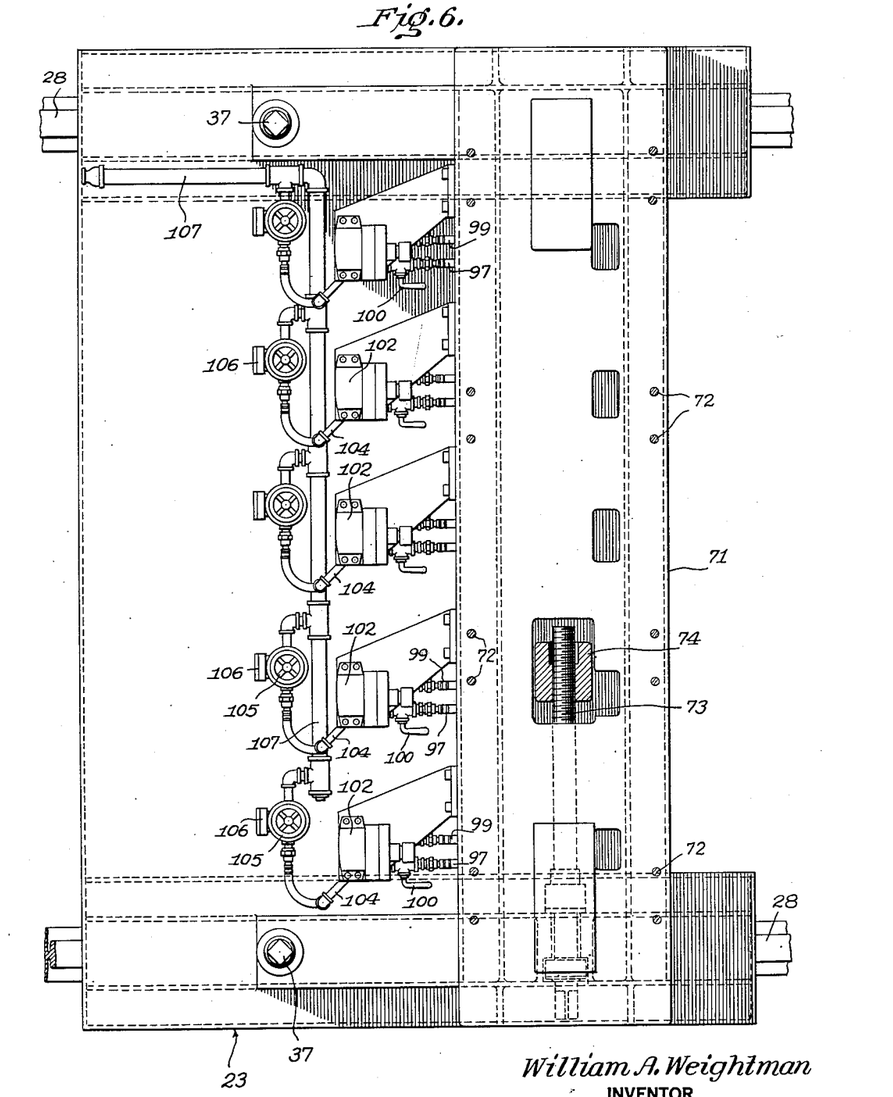
Fig. 6 is a horizontal section taken on the line 6—6 of Fig. 2.

It may be desirable to move the entire end of a panel and the several slide frames 62 as a unit. For this purpose, the slide frames are mounted on a sub-slide, sub-frame or panel frame 70 which slides on a base frame 71. The sub-slide is provided with slots and is retained by bolts 72. It is moved, Fig. 6, by a rotating non-slidable screw 73 threaded into a depending projection 74, screws being provided so as to be accessible from both sides of the carriage, if desired.

Figures 8, 9:
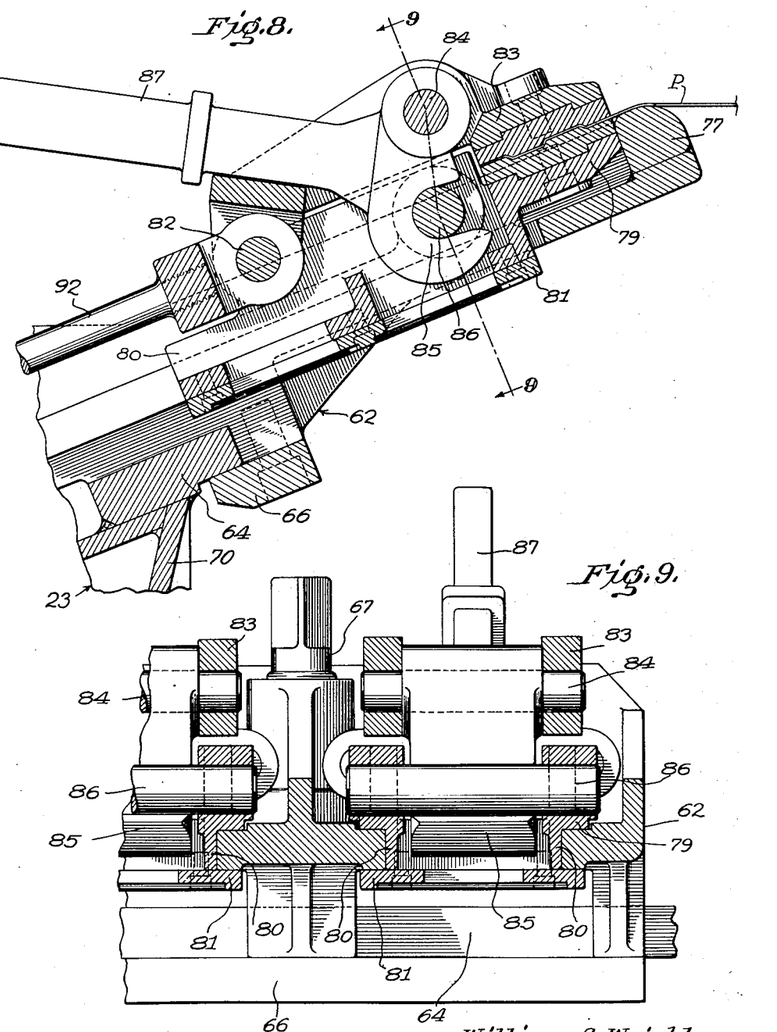
Fig. 8 is a partial vertical longitudinal section taken on the line 8—8 of Fig. 7.
Fig. 9 is a vertical transverse section taken on the line 9—9 of Fig. 8.
Figure 10:
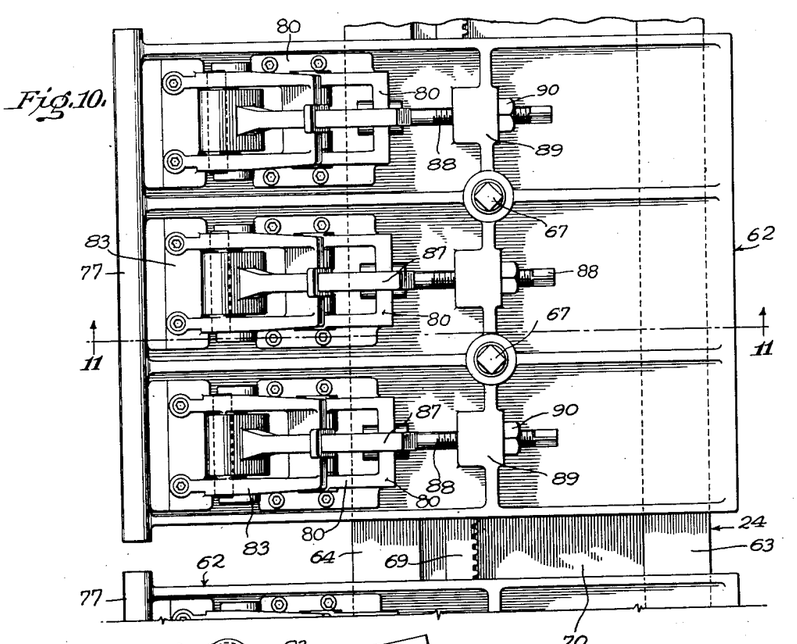
Fig. 10 is a top plan view taken about on the line 10—10 of Fig. 2.
Figures 11, 12:
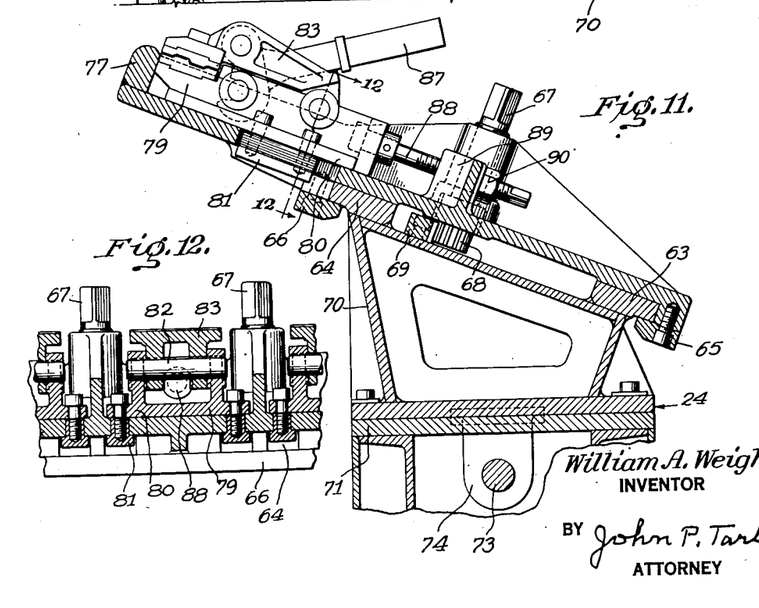
Fig. 11 is a vertical longitudinal section taken on the line 11—11 of Fig. 10.
Fig. 12 is a transverse section taken on the line 12—12 of Fig. 11.

As shown in Fig. 2, the skin 38 is supported in flattened condition at each end upon horizontal sheet rest bars 77 and is pulled down at an angle therebehind. On the right end, it is merely gripped and held; and on the left end, it is gripped and pulled. The gripping means 25 is the same on both ends. That for the left end is shown in Figs. 7 to 9, and that for the right end is shown in Figs. 10 to 12.

A lower gripping jaw 78 is provided on a jaw slide 80 which is movable longitudinally along suitable guides provided on the transversely movable sheet-holding frame 62, being held thereon by retaining means 81. There are, as stated before, a plurality of gripping devices on each sheet-holding frame. Upon each jaw slide 80 there is pivoted, as on the hinge pin 82, a companion upper jaw 83; and upon the jaw member 83 there is pivoted, as by a hinge pin 84, a cam 85 adapted to engage beneath a cam pin 90 on the lower jaw when the upper jaw is swung down. The cam 85 is operated to grip or release the sheet 38 by a handle 87.

The jaw slides 80 are moved longitudinally by suitable means. In the case of the gripping means on the right side, Figs. 10 to 12, the moving means is merely for adjustment and here each jaw slide 80 is provided with one or more adjustment screws 88 anchored to an upstanding lug or bracket 89, a stop nut 90 being provided on the screw 88.

At the left end, Figs. 4, 5, and 7, two rods 92 are secured to each jaw slide 80 and after passing through guide holes in upstanding lugs or brackets 93 are connected to the front end of a fluid-operated power cylinder 94. The cylinder is mounted to slide upon and react with a piston 95 which is secured to the bracket 93. Fluid is supplied to the outer side of the piston head by a channel 96 through the piston stem and a flexible conduit 97 and to the inner side through a channel 98 and a flexible conduit 99. The outer side of the piston head has greater area than the inner side to furnish the greater force for moving the jaws in skin stretching direction.

The conduits 97 for the three cylinders of one sheet-holding frame 62 are provided with individual hand cut-off valves 100 and are connected to a common pipe 101 leading to a reversing valve 102. Likewise, three conduits 99 are connected to a common pipe 103 leading to the reversing valve. Fluid is supplied to each reversing valve by a pipe 104 provided with a pressure adjustment device 105 and a pressure gage 106. The several pipes for the several sheet holders (five here) receive pressure fluid, preferably air, from a common fluid pipe 107.

The pipe 107 for each stretcher carriage 23 (Fig. 1) is connected by a flexible conduit 108 with a fluid main 109 which parallels the tracks and is provided with connection outlets at frequent intervals.

An electric supply main 110 with frequent outlets parallels the tracks and each carriage is provided with a flexible cable 111 for connecting to the main 110. The welding devices are also supplied from such power and fluid mains as may be required through suitable connections, not shown.

In operation, a number of sheets are clamped in the two carriages of a pair, the edges of the sheets protruding from the sides of the horizontal bars 77 which support all sheets of a panel at a common elevation and a common longitudinal position or in a common line across the panel.

The carriages, of course, will first have been clamped to their supporting rails at the correct distance apart and at the desired location along the tracks. Incidental to the clamping action, the stretcher cylinders 94 are supplied with fluid under low pressure to place a slight tension in the sheet. Where a full width sheet is used, the fluid is supplied to all three cylinders of a group together.

When two adjacent sheets have thus been clamped, one or both sheets are moved transversely to bring their protruding edges into the desired overlapping relationship. This is done by turning the pinions 68 along the racks 69 at both ends simultaneously to move the sheet-holding frames 62 along their ways.

When all of the sheets which are to comprise a panel are assembled in proper mutual relationship, the entire panel may be shifted at one or both ends by turning the screws 73 to traverse the sub-slides 70.

Either the frames 62 or the sub-slides 70 may be moved at any desired time, the operation described above being the usual one.

After all of the sheets have been properly positioned, the pressure of fluid in the cylinders 94 is increased to increase the tension on the sheets.

Stringers 34 are now placed in desired locations on the panel and one or more of the welding machines is brought up into operating position on one or both sides of the panel respectively. The sheets may be tack-welded together and the stringers may be tack-welded to the panel, if desired.

During welding, the guide rolls 51 hold the stringers in correct position immediately ahead of the welding rolls 49. When desired, the welds are peened as the work progresses by the peening device 53.

This apparatus provides very simple and convenient means for stretching and lapping a plurality of sheets to form a panel and holding the panel in proper position for one or more welding machines. The panels are available to welding machines on either side and a plurality of panels are available to any selected machine or machines. This is very important inasmuch as the make-ready time required for setting up a panel in a stretcher may amount to more than the welding time.

While one embodiment of the invention has been described for purposes of illustration, it is to be understood that there may be various embodiments within the limits of the prior art and the scope of the subjoined claims.

What is claimed is:

1. Sheet metal working apparatus comprising in combination, a pair of supports adapted to hold stretched between them a panel composed of a plurality of sheets, each support having a plurality of adjacent sheet-clamping frames adapted to hold sheets at their ends with their side edges projecting, and means for moving the frames transversely relative to each other whereby to bring the projecting edges of the sheets into overlapping relationship.

2. Sheet metal working apparatus comprising in combination, a pair of supports adapted to hold a panel composed of a plurality of sheets, each support having a plurality of adjacent sheet-clamping frames adapted to hold a sheet, each sheet-clamping frame including a plurality of sheet clamps mounted for independent movement thereon, and means for moving the frames transversely relative to each other whereby to bring the edges of the sheets together.

3. Sheet metal working apparatus comprising in combination, a pair of supports adapted to hold a panel composed of a plurality of sheets, each support having a plurality of sheet-clamping frames adapted to hold a sheet, means for moving the frames transversely relative to each other to bring the edges of the sheet together, a sub-frame supporting the sheet-clamping frames on a support, and means for moving the sub-frame transversely on the support to shift the ends of the panel as a unit.

4. Sheet metal working apparatus comprising in combination, a pair of supports adapted to hold a panel composed of a plurality of sheets, said supports having movement relative to each other for accommodating panels of different length, means for clamping a movable support in adjusted position, a transversely adjustable panel frame on each support, means for adjusting the position of a panel frame and holding it in adjusted position, a plurality of sheet frames on each panel frame, said sheet frames having movement relative to each other for adjusting the lateral position of one sheet relative to another, means for adjusting the position of the sheet frame, a plurality of sheet clamps on each sheet frame, and means for moving each sheet clamp longitudinally to stretch the sheet.

5. Apparatus as set forth in claim 4, further characterized by the fact that the moving means for the sheet clamps on one support of a pair includes fluid operated devices, one for each clamp.

6. Apparatus as set forth in claim 4, further characterized by the fact that the sheet frames of each support include sheet rest bars which support all sheets of a panel at a common elevation and a common longitudinal position.

7. Apparatus as set forth in claim 4, further characterized by the fact that the sheet frames of each support include rest bars which support the sheets in a common line across the panel.

8. Sheet metal working apparatus comprising in combination, a support for each end of a panel, a plurality of sheet frames on one of said supports, said frames being adjustable in position transversely of the panel, and means including a fixed rack and a pinion on each sheet frame adapted to cooperate with said rack to move the frame.

WILLIAM A. WEIGHTMAN.

REFERENCES CITED

The following references are of record in the file of this patent:

UNITED STATES PATENTS

| Number | Name | Date |
| --- | --- | --- |
| 1,304,594 | Patscheider | May 27, 1919 |
| 1,753,070 | Schwartz et al. | Apr. 1, 1930 |
| 1,973,159 | Vehko | Sept. 11, 1934 |
| 2,039,857 | Vetorino | May 5, 1936 |
| 2,163,590 | Ganahl et al. | June 27, 1939 |
| 2,218,503 | Brooks et al. | Oct. 22, 1940 |
| 2,220,704 | Boles et al. | Nov. 5, 1940 |
| 2,221,187 | Gunn et al. | Nov. 12, 1940 |
| 2,293,169 | Platz | Aug. 18, 1942 |